US012613996B2

(12) United States Patent
Spreen et al.

(10) Patent No.: US 12,613,996 B2
(45) Date of Patent: Apr. 28, 2026

(54) SYSTEMS AND METHODS FOR IMAGE PRIVACY AND DE-IDENTIFICATION

(71) Applicant: State Farm Mutual Automobile Insurance Company, Bloomington, IL (US)

(72) Inventors: Anjela Spreen, Hewitt, TX (US); Geetha P. Nagarajan, Plano, TX (US); Salomon K. Kabongo, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 53 days.

(21) Appl. No.: 18/624,199

(22) Filed: Apr. 2, 2024

(65) Prior Publication Data

US 2024/0386139 A1 Nov. 21, 2024

Related U.S. Application Data

(60) Provisional application No. 63/587,638, filed on Oct. 3, 2023, provisional application No. 63/502,319, filed on May 15, 2023.

(51) Int. Cl.
| | |
|---|---|
| *G06F 21/00* | (2013.01) |
| *G06F 21/10* | (2013.01) |
| *G06F 21/62* | (2013.01) |
| *G06T 5/70* | (2024.01) |
| *G06V 30/14* | (2022.01) |
| *G06V 40/16* | (2022.01) |

(52) U.S. Cl.
CPC ...... *G06F 21/6254* (2013.01); *G06F 21/1066* (2023.08); *G06T 5/70* (2024.01); *G06V 30/1448* (2022.01); *G06V 40/172* (2022.01); *G06V 2201/10* (2022.01)

(58) Field of Classification Search
CPC ... G06F 21/6254; G06F 21/1066; G06T 5/70; G06V 30/1448; G06V 40/172; G06V 2201/10; G06V 10/82
See application file for complete search history.

(56) References Cited

U.S. PATENT DOCUMENTS

| | | |
|---|---|---|
| 8,457,448 B2 | 6/2013 | Shelton et al. |
| 8,542,951 B2 | 9/2013 | Ohashi |
| | (Continued) | |

FOREIGN PATENT DOCUMENTS

| | | |
|---|---|---|
| KR | 2023038088 A | 3/2023 |
| WO | 2013067092 A1 | 5/2013 |

*Primary Examiner* — Ghazal B Shehni
(74) *Attorney, Agent, or Firm* — Armstrong Teasdale LLP

(57) ABSTRACT

A computer system is provided and is programmed to: (1) receive a plurality of images; and/or (2) for each image of the plurality of images, the at least one processor is programmed to: (a) retrieve an image of the plurality of images; (b) execute at least one model to analyze the retrieved image to detect one or more individuals; (c) identify one or more items of text in the retrieved image; (d) analyze the one or more items of text to detect one or more personally identifiable items; (e) identify one or more items of text to obscure based upon one or more security settings; (f) update the retrieved image to obscure at least one of the one or more items of text to obscure and the one or more individuals; and/or (g) provide the updated image.

19 Claims, 12 Drawing Sheets

(56)                References Cited

U.S. PATENT DOCUMENTS

| 10,482,280 | B2 * | 11/2019 | Abi Antoun | G06F 21/554 |
| 2017/0337393 | A1 * | 11/2017 | Crowe | G06F 21/6254 |
| 2019/0377901 | A1 * | 12/2019 | Balzer | H04L 63/0421 |
| 2021/0124919 | A1 * | 4/2021 | Balakrishnan | B42D 25/309 |
| 2021/0398676 | A1 * | 12/2021 | Evans | G16H 30/40 |
| 2023/0106873 | A1 | 4/2023 | Qin et al. | |
| 2023/0206684 | A1 * | 6/2023 | Torabi | G06N 3/045 |
| | | | | 382/104 |
| 2024/0371192 | A1 * | 11/2024 | Jayaraman | G06V 20/52 |

* cited by examiner

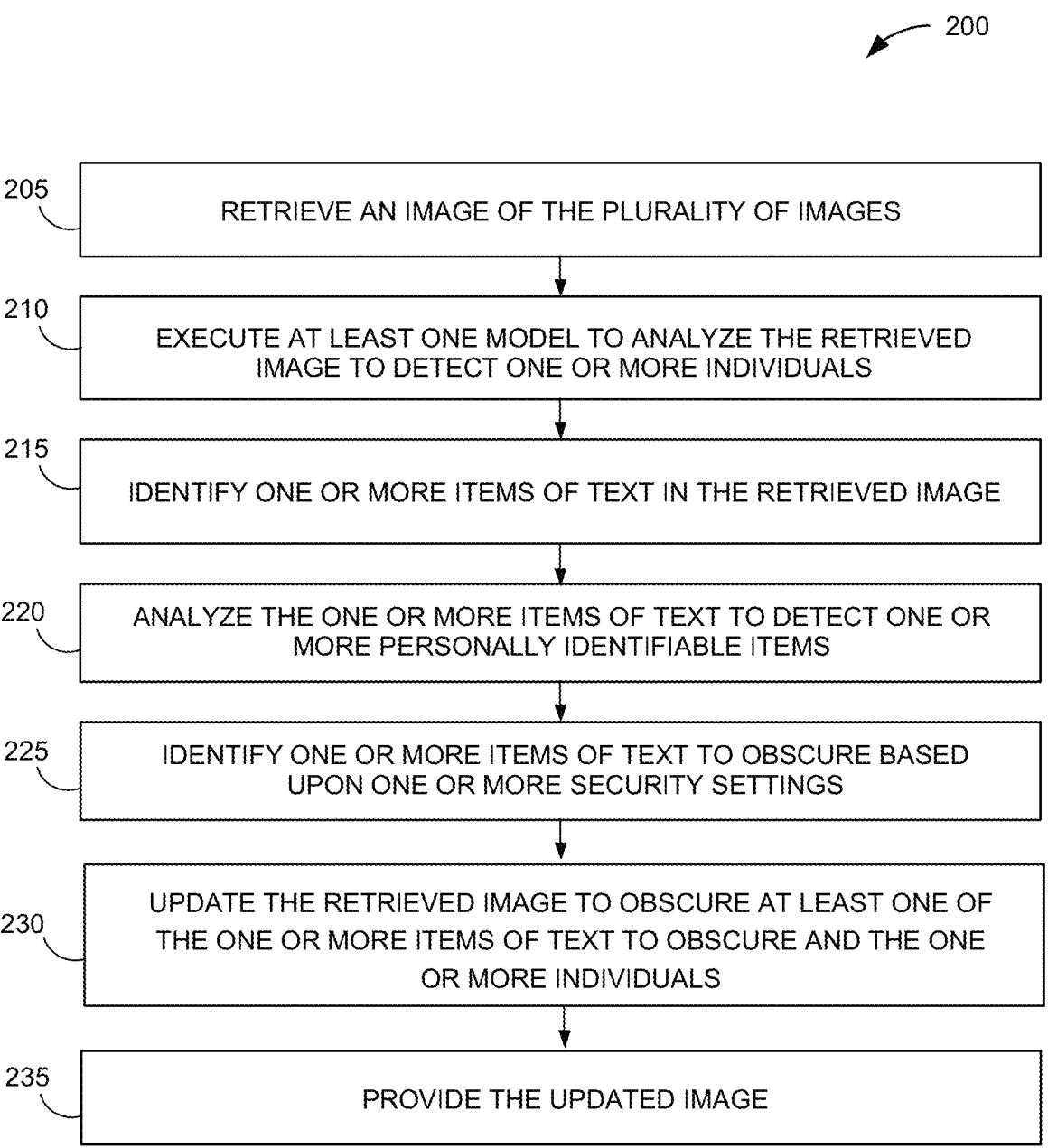

200

205 — RETRIEVE AN IMAGE OF THE PLURALITY OF IMAGES

210 — EXECUTE AT LEAST ONE MODEL TO ANALYZE THE RETRIEVED IMAGE TO DETECT ONE OR MORE INDIVIDUALS

215 — IDENTIFY ONE OR MORE ITEMS OF TEXT IN THE RETRIEVED IMAGE

220 — ANALYZE THE ONE OR MORE ITEMS OF TEXT TO DETECT ONE OR MORE PERSONALLY IDENTIFIABLE ITEMS

225 — IDENTIFY ONE OR MORE ITEMS OF TEXT TO OBSCURE BASED UPON ONE OR MORE SECURITY SETTINGS

230 — UPDATE THE RETRIEVED IMAGE TO OBSCURE AT LEAST ONE OF THE ONE OR MORE ITEMS OF TEXT TO OBSCURE AND THE ONE OR MORE INDIVIDUALS

235 — PROVIDE THE UPDATED IMAGE

2011 Champ Rd Dallas Texas

505

510

515

705

710

715

SYSTEMS AND METHODS FOR IMAGE PRIVACY AND DE-IDENTIFICATION

CROSS-REFERENCE TO RELATED APPLICATIONS

This application claims priority to U.S. Provisional Patent Application No. 63/587,638, filed Oct. 3, 2023, and U.S. Provisional Patent Application No. 63/502,319, filed May 15, 2023, the entire contents, and disclosures of which are hereby incorporated herein by reference in their entirety.

FIELD OF THE DISCLOSURE

The present disclosure relates to an image de-identification tool, and more particularly, to a network-based system and method for analyzing images to detect, identify, and remove personally identifiable information from those images.

BACKGROUND

Digital images (e.g., photos and/or videos) may oftentimes be captured by cameras and stored on memory. In some cases, those digital images may be shared with other systems that may process those images further. Those images may then be used for various reasons, such as, but not limited to, machine learning training, marketing materials, informational materials, and/or other potentially publicly facing purposes. However, sometimes those images may have information that may identify one or more individuals in those images.

While, personally identifying metadata may be easily removed from images, personally identifiable information that may be viewed in the images themselves may be hard to identify and remove. It would be advisable to have a system for automatically detecting, identifying, and removing the personally identifiable information from images. Conventional techniques may include additional inefficiencies, ineffectiveness, encumbrances, and other drawbacks as well.

BRIEF SUMMARY

The present embodiments may relate to, inter alia, an image de-identification tool, and more particularly, to a network-based system and method for analyzing images to detect, identify, and remove personally identifiable information from those images. The systems and methods described herein may provide for analyzing a plurality of images to detect and identify any personally identifiable information and remove that information from the corresponding images. The present systems and methods may further include a plurality of models trained to recognize individuals and text in the images, where the individuals and text are analyzed to identify any personally identifiable information and remove that information from the images.

In one aspect, a computer system may be provided. The computer system may include one or more local or remote processors, servers, sensors, memory units, transceivers, mobile devices, wearables, smart watches, smart glasses or contacts, augmented reality glasses, virtual reality headsets, mixed or extended reality headsets, voice bots, chat bots, ChatGPT bots, and/or other electronic or electrical components, which may be in wired or wireless communication with one another. For instance, the computer system may include a computing device that may include at least one processor in communication with at least one memory device. The at least one processor may be configured to: (1) receive a plurality of images; and/or (2) for each image of the plurality of images, the at least one processor is programmed to: (a) retrieve an image of the plurality of images; (b) execute at least one model to analyze the retrieved image to detect one or more individuals; (c) identify one or more items of text in the retrieved image; (d) analyze the one or more items of text to detect one or more personally identifiable items; (e) identify one or more items of text to obscure based upon one or more security settings; (f) update the retrieved image to obscure at least one of the one or more items of text to obscure and the one or more individuals; and/or (g) provide the updated image. The computer system may include additional, less, or alternate functionality, including that discussed elsewhere herein.

In another aspect, a computer-implemented method may be provided. The computer-implemented method may be performed by a hierarchical model image analysis (HMIA) computer device including at least one processor in communication with at least one memory device. The method may include: (1) receiving a plurality of images; and/or for each image of the plurality of images, the method may further include: (a) retrieving an image of the plurality of images; (b) executing at least one model to analyze the retrieved image to detect one or more individuals; (c) identifying one or more items of text in the retrieved image; (d) analyzing the one or more items of text to detect one or more personally identifiable items; (e) identifying one or more items of text to obscure based upon one or more security settings; (f) updating the retrieved image to obscure at least one of the one or more items of text to obscure and the one or more individuals; and/or (g) providing the updated image. The computer-implemented method may include additional, less, or alternate actions, including those discussed elsewhere herein.

In another aspect, at least one non-transitory computer-readable media having computer-executable instructions embodied thereon may be provided. When executed by a computing device including at least one processor in communication with at least one memory device, the computer-executable instructions may cause the at least one processor to: (1) receive a plurality of images; and/or (2) for each image of the plurality of images, the at least one processor is programmed to: (a) retrieve an image of the plurality of images; (b) execute at least one model to analyze the retrieved image to detect one or more individuals; (c) identify one or more items of text in the retrieved image; (d) analyze the one or more items of text to detect one or more personally identifiable items; (e) identify one or more items of text to obscure based upon one or more security settings; (f) update the retrieved image to obscure at least one of the one or more items of text to obscure and the one or more individuals; and/or (g) provide the updated image. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 2 illustrates an exemplary computer-based process of de-identifying images using the system shown in FIG. 1.

Figure 1:
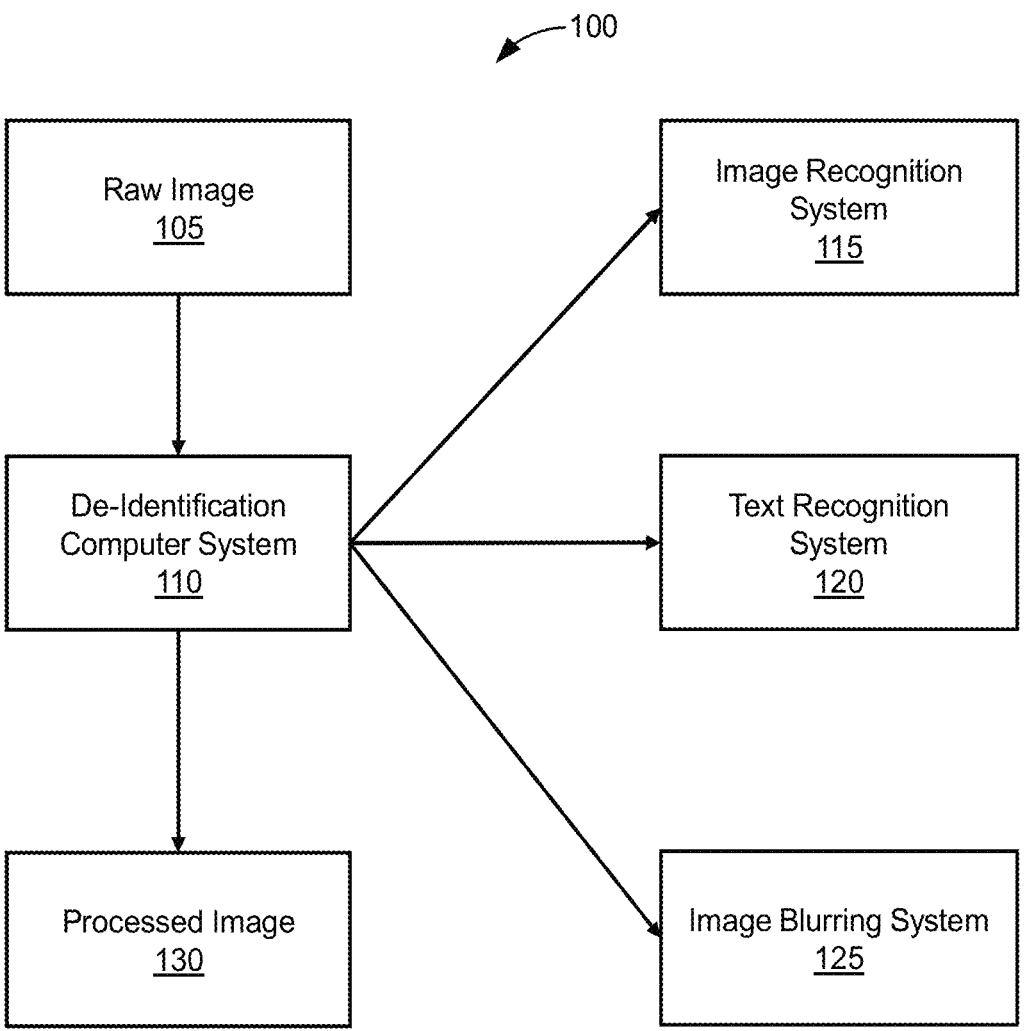
FIG. 1 illustrates a block diagram of an exemplary image de-identification tool in accordance with at least one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for an image de-identification tool, and more particularly, to a network-based system and method for analyzing images to detect, identify, and remove personally identifiable information from those images. In one exemplary embodiment, the process may be performed by a de-identification (DI) computer device. In the exemplary embodiment, the DI computer device may be in communication with one or more client devices and one or more analysis models. As described below in further detail, the DI computer system includes multiple, image evaluating models that are trained to recognize different types of personal information and sensitive personal information (PI/SPI)—including Personal Information (PI), Personally Identifiable Information (PII), Nonpublic Personal Information (NPI), and Sensitive Personal Information (SPI). PI/SPI is information that may be used on its own or combined with other information to identify, contact, or locate a single person, or to identify an individual in context. Unauthorized access/acquisition of this data may cause risk to the individual. For the purposes of this discussion, PI/SPI may include, but is not limited to, not only text information about an individual, but also images of the individual, such as those showing the face of the individual. For the purposes of this discussion, PII may include, but is not limited to, not only text information about an individual, but also images of the individual, such as those showing the face of the individual.

In the exemplary embodiment, the DI computer device may be configured to receive images and remove PII from the images. The DI computer device may use multiple models (and/or bots) to detect, identify, and remove the PII from the images. The DI computer device may use an image recognition system to scan the images for images of people, especially, the faces of people in the images. In some embodiments, the image recognition system analyzes the images to recognize faces. In other embodiments, the image recognition system analyzes the images to recognize any part of a person in the image.

The DI computer device may also use a text recognition system to recognize and analyze text in the image. The text may have been added to the image, such as an overlay added by a camera or after the image was taken. The text may also be a part of the image itself. For example, the text may be on one or more papers on a desk in the image or hanging on a wall, such as a plaque or framed certificate. The text recognition system analyzes the text to determine if it contains PII. The text recognition system has been trained to recognize different types of PII. In some embodiments, there are user preferences that assist the text recognition system in determining if specific pieces of information are to be considered PII.

The image recognition system and the text recognition system report back to the DI computer device where the PII was found in the image. In some embodiments, the DI computer device receives x-y coordinates of where the PII is found. In other embodiments, the DI computer device receives a pixel mask to show where the PII is found. Then the DI computer device may blur the image around the areas where the PII has been found.

In the exemplary embodiment, the image blurring occurs at the pixel level where the individual pixels that make up the PII and the pixels around them are blurred out. In some embodiments, the blurring uses a specific color, such as a dark grey. In other embodiments, the blurring tries to match background colors. In still further embodiments, facial blurring uses the specific color blurring, and the text blurring uses the color matching blurring. In some embodiments, masks are applied to cover up the PII. These masks may be on a separate layer from the image and/or the same layer of the image.

In some further embodiments, the DI computer device, the image recognition system, and/or the text recognition system may be trained to recognize copyrighted information. The systems may have access to one or more databases of copyrighted information to compare to the image to detect portions of the image that contain copyrighted information that the user wants to have blurred and/or removed from the image(s).

In some embodiments, the DI computer device detects copyright information based upon comparisons with one or more databases of copyright information. These databases may be related to the DI computer device. These databases may also be separate from and in communication with the DI computer device. The DI computer device may scan for copyright information in the images including, but not limited to, text data (such as passages and/or phrases from copyrighted material) and images (such as copyrighted photographs and company logos). The DI computer device may determine which of these to potential copyrighted items to obscure based upon the corresponding security levels.

In some additional embodiment, the DI computer device, the image recognition system, and/or the text recognition system may be trained to recognize confidential information. In this embodiment, images taken around a workplace may be analyzed to ensure that no confidential information is accidentally in the image(s). For example, one or more images of a birthday party or promotion announcement in the office environment, may inadvertently include confidential information, such as a reflection that shows a prototype or one or more papers on a desk. The systems may then recognize the confidential information and remove that information from the image.

In some further embodiments, the images are three-dimensional (3D) images, such as those that may be used in a virtual reality.

While the above describes using the systems and processes described herein for analyzing property, one having skill in the art would understand that these systems and methods may also be used for classifying items, such as vehicles, antiques, and/or other objects that need to be analyzed and classified.

At least one of the technical problems addressed by this system may include: (i) large amounts of training data required to recognize all types of PII and confidential information; (ii) difficulty in accurately classifying text and figures in images; (iii) difficulty in recognizing incidental figures and text; (iv) large numbers of images that need to be processed; and/or (v) need to train artificial intelligences with non-copyrighted and/or non-personally identifiable information.

A technical effect of the systems and processes described herein may be achieved by performing at least one of the following steps: (i) receiving a plurality of images; and/or for each image of the plurality of images, the method further may include: (a) retrieving an image of the plurality of images; (b) executing at least one model to analyze the retrieved image to detect one or more individuals; (c) identifying one or more items of text in the retrieved image; (d) analyzing the one or more items of text to detect one or more personally identifiable items; (e) updating the retrieved image to obscure at least one of the one or more personally identifiable items and the one or more individuals; and/or (f) providing the updated image.

Exemplary Computer System for a De-Identification Tool

FIG. 1 illustrates a block diagram of an image de-identification (DI) system 100 in accordance with at least one embodiment. The DI system 100 described herein includes a plurality of identification models, where the plurality of identification models identify different items of personally identifiable information (PII) in images.

The DI system 100 receives a plurality of images 105 to be analyzed. In at least one embodiment, the plurality of raw images 105 are associated with a property, such as, but not limited to, a home, a rental unit, a building, and/or any other property. In some embodiments, the plurality of raw images 105 are received from a camera device associated with a client device 805 (shown in FIG. 8), such as a mobile phone.

Figure 8:
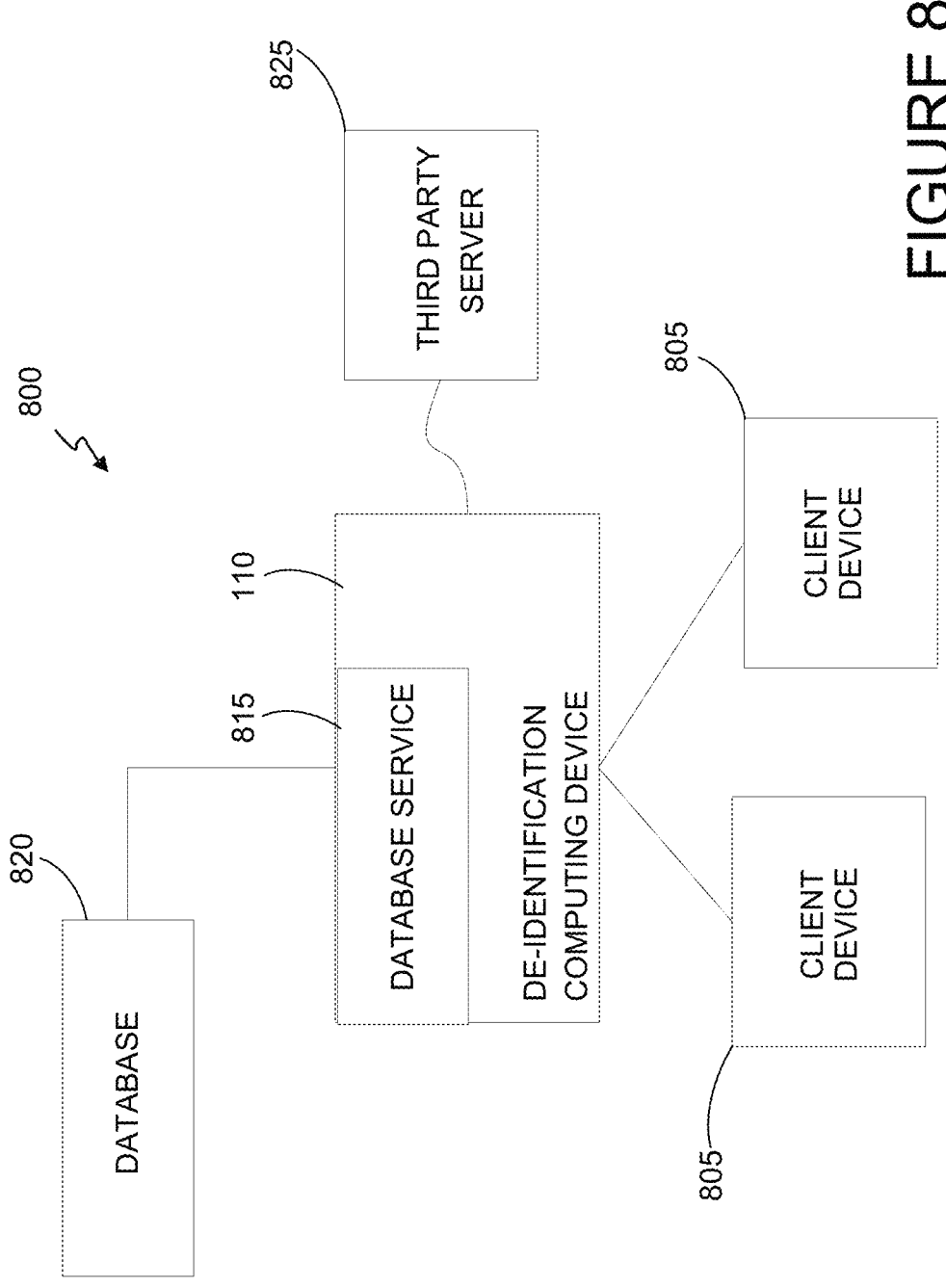
FIG. 8 illustrates an exemplary computer system for performing the process shown in FIG. 2 using the system shown in FIG. 1.

In other embodiments, the plurality of images 105 are received from a third-party source, such as a third-party server 825 (shown in FIG. 8). This plurality of raw images 105 may be from one or more websites, such as websites for the sale and/or rental of property. In still further embodiments, the plurality of raw images 105 are received from one or more databases, such as database 820 (shown in FIG. 8). In some embodiments, the plurality of raw images 105 are from one or more videos. In an additional embodiment, the plurality of raw images 105 may include three-dimensional (3D) images that may be used in a virtual environment.

For the purposes of this discussion, the DI system 100 is configured to analyze the raw images 105 for PII and remove that PII from the image. In the exemplary embodiment, the DI system 100 receives a plurality of raw images 105 to be analyzed. In the exemplary embodiment, the DI system 100 includes a DI computer system 110 for controlling the DI process 200 (shown in FIG. 2). The DI computer system 110 receives the raw images 105 and routes the raw images 105 to an image recognition system 115 and a text recognition system 120. In some embodiments, the DI computer system 110 routes the raw images 105 to the image recognition system 115 and the text recognition system 120 serially. In other embodiments, the DI computer system 110 routes the raw images 105 to the image recognition system 115 and the text recognition system 120 simultaneously, or in parallel.

Figure 3:
FIG. 3 illustrates an exemplary image with at least one face to be obscured, using the system shown in FIG. 1 and the process shown in FIG. 2.

The image recognition system 115 is configured to analyze the raw images 105 to determine if there are any personally identifiable information (PII) representations in the image. In the exemplary embodiment, the image recognition system 115 analyzes the raw images 105 to detect faces of individual in the raw image 105. This may be the face of a person directly in the image, such as the subject of the image. The individual may also be incidentally in the image, where the individual is not the subject of the image but may be seen elsewhere in the image. This may be in the background, in a picture (such as on a wall) in the image, and/or in a reflection in the image. For example, as shown in FIG. 3, there are reflections of individuals in the glass of the microwave in the image.

In the exemplary embodiment, the image recognition system 115 analyzes the raw images 105 for faces. In other embodiments, the image recognition system 115 may also analyze the images for other portions of the individuals, such as, but not limited to, tattoos, scars, and/or other identifying marks on the individuals. In still further embodiments, the image recognition system 115 analyzes the images for copyrighted information or other information that the user does not wish to have in the images. For example, if the user represents a business, then the user may instruct the image recognition system 115 to recognize the logos, brands, and/or trade dress of their competitors.

In the exemplary embodiment, the text recognition system 120 analyzes the raw images 105 for text. The text recognition system 120 may recognize letters and numbers in a variety of languages. In the exemplary embodiment, the text recognition system 120 is programmed and/or trained to recognize text in a plurality of fonts and sizes. Then the text recognition system 120 analyzes the text to determine the content of the text. The text recognition system 120 may analyze the content of the text to recognize PII in the text. The text recognition system 120 may also analyze the text to detect curse words and/or other phrases and/or language that the user does not want shown in their images. In some embodiments, the user may include a database 820 of words and/or phrases that are not allowed to be in their images. The database 820 may include those words and phrases in a variety of languages.

The text recognition system 120 may analyze the content of the text to determine if there is PII in the text. The PII may include, but is not limited to, name, address, location age, birthday, ethnicity, height, weight, hair color, eye color, and/or any other attribute that may be used for identification, either on its own or in combination with other attributes and/or items of information. Other sensitive personal information my include, but is not limited to: Social security number (SSN)(U.S.) including when used as a tax identification number (TIN), or social insurance number (SIN) (Canada); Driver's license number or state ID card number; Credit/debit card account number; Financial account number e.g., bank deposit account number, mutual fund account number; accounts with revolving access to credit; Biometrics e.g., fingerprints, retina/iris scans, hand/facial geometry scans, gait/voice patterns, or Typing rhythms; Medical information; and/or Protected Health Information (PHI) and any other health information. Furthermore, other information to protect may come from different industries, such the Payment Card Industry (PCI), for example. Examples of information include but are not limited to: Credit/Debit Card Numbers; Name (combined with card number); Expiration date (combined with card number); 3 or 4 digit "Security Code"; and/or PIN Number. Further other PII may include but is not limited to: Full Name; Claim, Policy, Loan, and/or Mortgage Number; company alias, company email, and/or employee number.

In some embodiments, the text recognition system 120 may detect different levels of PII in the image. For example, the user may have settings determining which items of information are considered PII and inform the text recognition system 120. In some embodiments, names are removed, but not addresses, such as in an image for a real-estate listing. In other embodiments, all information is removed. In still further embodiments, each level of security or privacy has one or more items of PII associated with it. In these embodiments, the user may select which levels of security or privacy to activate. In some of these embodiments, the user may select a security or privacy slider to select which levels of security or privacy to activate.

The DI computer system 110 receives indications of the locations of the PII by the image recognition system 115 and/or the text recognition system 120. In the exemplary embodiment, the DI computer system 110 may receive coordinates of the location of the PII. These coordinates may cover an area where the PII is contained in the corresponding image. In some embodiments, the DI computer system 110 also receives information about the type of PII detected. The DI computer system 110 uses the coordinates and/or type information to determine which information should be blurred. In some embodiments, the DI computer system 110 also determines the type of blurring that should be used on each piece of PII detected.

In the exemplary embodiment, the DI computer system 110 transmits the coordinates of the PII and the image to the image blurring system 125. The image blurring system 125 may be configured to blur areas of the image, based upon the received coordinates. The image blurring system 125 may also receive and use a boundary parameter that also blurs the image in a defined area around the PII coordinates. For example, the image blurring system 125 may blur the image for an area around the PII of 20 pixels. This prevents easy reconstruction of the PII.

In some embodiments, the image blurring system 125 may also perform different types of blurring. In some of these embodiments, the image blurring system 125 applies a mask to the area to be blurred. In some of these embodiments, the mask may be applied in a layer that covers the PII of the original image. In other embodiments, the image blurring system 125 directly rewrites the pixels of and around the PII. Furthermore, in some embodiments, the image blurring system 125 may use background colors in the image to blur the PII. In other embodiments, the image blurring system 125 may use pre-defined colors to replace the pixels of the PII. In some further embodiments, different types of information may be blurred with different techniques and/or different colors. For example, the image blurring system 125 may blur faces in grey, while plurality text PII in background colors.

After the image has been blurred, the DI computer system 110 receives the updated image and provides the processed image 130 to the user.

In some embodiments, the DI system 100 works on one image at a time. In other embodiments, the DI system 100 may process a plurality of images 105 in parallel.

In some embodiments, the DI computer system 110 includes the image recognition system 115, the text recognition system 120, and/or the image blurring system 125. In other embodiments, one or more of the image recognition system 115, the text recognition system 120, and/or the image blurring system 125 may be hosted on other computer systems, where the DI computer system 110 is in communication with the image recognition system 115, the text recognition system 120, and/or the image blurring system 125 through the other computer system. In at least one embodiment, the image recognition system 115 and/or the text recognition system 120 are trained as models to take an image as an input and output information about the location and/or type of any PII detected in the image.

While the above describes using the systems and processes described herein for analyzing two dimensional images, one having skill in the art would understand that these systems and methods may also be used for analyzing and processing three-dimensional images and/or objects, such as those for use in virtual reality environments.

Exemplary Process for De-Identification

FIG. 2 illustrates an exemplary process 200 of de-identifying images using the system 100 (shown in FIG. 1). In the exemplary embodiment, process 200 is performed by DI system 100 (shown in FIG. 1).

In the exemplary embodiment, the DI computer system 110 retrieves 205 an image 105 (shown in FIG. 1). In at least one embodiment, the image 105 is associated with a property, such as, but not limited to, a home, a rental unit, a building, and/or any other property. In some embodiments, the image 105 is received from a camera device associated with a client device 805 (shown in FIG. 8), such as a mobile phone. In other embodiments, the image 105 is received from a third-party source, such as a third-party server 825 (shown in FIG. 8). The image 105 may be from a website, such as a website for the sale and/or rental of property. In still further embodiments, the image 105 is received from one or more databases, such as database 820 (shown in FIG. 8). In some embodiments, the image 105 is from one or more videos. In an additional embodiment, the images 10 may include a three-dimensional (3D) image that may be used in a virtual environment.

In the exemplary embodiment, the DI computer system 110 executes 210 at least one model (and/or bots, such as a ChatGPT bot) to analyze the retrieved image 105 to detect one or more individual in the image 105. In at least one embodiment, the executed model is a part of the image recognition system 115 (shown in FIG. 1). The image recognition system 115 analyzes the raw images 105 to detect faces of individual in the raw image 105. This may be the face of a person directly in the image, such as the subject of the image. The individual may also be incidentally in the image, where the individual is not the subject of the image but may be seen elsewhere in the image. This may be in the background, in a picture (such as on a wall) in the image, and/or in a reflection in the image. For example, as shown in FIG. 3, there are reflections of individuals in the glass of the microwave in the image.

In the exemplary embodiment, the image recognition system 115 analyzes the raw images 105 for faces. In other embodiments, the image recognition system 115 may also analyze the images for other portions of the individuals, such as, but not limited to, tattoos, scars, and/or other identifying marks on the individuals. In still further embodiments, the image recognition system 115 analyzes the images for copyrighted information or other information that the user does not wish to have in the images. For example, if the user represents a business, then the user may instruct the image recognition system 115 to recognize the logos, brands, and/or trade dress of their competitors.

In the exemplary embodiment, the DI computer system 110 identifies 215 one or more items of text in the image 105. In some embodiments, the DI computer system 110 executes one or more models that have been trained to identify text. The one or more models may be a part of the text recognition system 120 (shown in FIG. 1)

The text recognition system 120 may recognize letters and numbers in a variety of languages. In the exemplary embodiment, the text recognition system 120 is programmed and/or trained to recognize text in a plurality of fonts and sizes. Then the text recognition system 120 analyzes the text to determine the content of the text. The text recognition system 120 may analyze the content of the text to recognize PII in the text. The text recognition system 120 may also analyze the text to detect curse words and/or other phrases and/or language that the user does not want shown in their images. In some embodiments, the user may include a database 820 (shown in FIG. 8) of words and/or phrases that are not allowed to be in their images. The database 820 may include those words and phrases in a variety of languages.

The text recognition system 120 and/or the DI computer system 110 analyze 220 the one or more items of text to detect one or more personally identifiable items. The DI computer system 110 analyzes 220 the content of the text to determine if there is PII in the text. The PII may include, but is not limited to, name, address, location, age, birthday, ethnicity, height, weight, hair color, eye color, and/or any other attribute that may be used for identification, either on its own or in combination with other attributes and/or items of information. Other sensitive personal information my include, but is not limited to: Social security number (SSN) (U.S.) including when used as a tax identification number (TIN), or social insurance number (SIN)(Canada); Driver's license number or state ID card number; Credit/debit card account number; Financial account number e.g., bank deposit account number, mutual fund account number; accounts with revolving access to credit; Biometrics e.g., fingerprints, retina/iris scans, hand/facial geometry scans, gait/voice patterns, or Typing rhythms; Medical information; and/or Protected Health Information (PHI) and any other health information. Furthermore, other information to protect may come from different industries, such the Payment Card Industry (PCI), for example. Examples of information include but are not limited to: Credit/Debit Card Numbers; Name (combined with card number); Expiration date (combined with card number); 3 or 4 digit "Security Code"; and/or PIN Number. Further other PII may include but is not limited to: Full Name; Claim, Policy, Loan, and/or Mortgage Number; company alias, company email, and/or employee number.

In the exemplary embodiment, the DI computer system 110 identifies 225 one or more items of text to obscure based upon one or more security settings. In some embodiments, the text recognition system 120 may detect different levels of PII in the image, which may be associated with different security settings. Different security settings may set the security levels indicating which items are to be obscured by the DI computer system 110. For example, the user may have settings determining which items of information are considered PII and inform the text recognition system 120. In some embodiments, names are removed, but not addresses, such as in an image for a real-estate listing. In other embodiments, all information is removed. In still further embodiments, each level of security or privacy has one or more items of PII associated with it. In these embodiments, the user may select which levels of security or privacy to activate. In some of these embodiments, the user may select a security or privacy slider to select which levels of security or privacy to activate. In one example, one or more settings may be associated with metadata, where the setting determines which metadata is removed from the image. For example, the name of the person who created the image may be removed, but not the date that the picture was created or when it was last modified and/or updated.

In the exemplary embodiment, the DI computer system 110 updates 230 the image 105 to obscure at least one of the one or more text to obscure and/or the one or more individuals. In at least one embodiment, the image 105 is updated 230 by the image blurring system 125. The image blurring system 125 is configured to blur areas of the image, based upon the received coordinates. The image blurring system 125 may also receive and use a boundary parameter that also blurs the image in a defined area around the PII coordinates. For example, the image blurring system 125 may blur the image for an area around the PII of 20 pixels. This prevents easy reconstruction of the PII.

In some embodiments, the image blurring system 125 may also perform different types of blurring. In some of these embodiments, the image blurring system 125 applies a mask to the area to be blurred. In some of these embodiments, the mask may be applied in a layer that covers the PII of the original image. In other embodiments, the image blurring system 125 directly rewrites the pixels of and around the PII. Furthermore, in some embodiments, the image blurring system 125 may use background colors in the image to blur the PII. In other embodiments, the image blurring system 125 may use pre-defined colors to replace the pixels of the PII. In some further embodiments, different types of information may be blurred with different techniques and/or different colors. For example, the image blurring system 125 may blur faces in grey, while plurality text PII in background colors. These different obscuring methods may be controlled by one or more security settings. In some embodiments, some information may be obscured using a first method and other information may be obscured using a second method.

In the exemplary embodiment, the DI computer system 110 provides 235 the updated image 130 (shown in FIG. 1) to the user, such as through the client device 805. Additionally or alternatively, the DI computer system 110 may obscure the at least one of the one or more personally identifiable items and the one or more individuals.

In additional embodiments, the DI computer system 110 may obscure the one or more individuals, by masking a plurality of pixels to cover each face of the one or more individuals. The DI computer system 110 may also alter pixels within a predetermined distance of the at least one of the one or more personally identifiable items.

In further embodiments, the DI computer system 110 may store one or more user preferences. The DI computer system 110 may compare the one or items of text to the one or more user preferences to determine if the one or items of text contain personally identifiable information (PII) and or the one or more security settings.

In additional embodiments, the DI computer system 110 may remove one or more pieces of metadata associated with the retrieved image 105. The DI computer system 110 may determine the one or more pieces of metadata to remove based upon the one or more security settings. One setting may require that names are removed from the metadata, while leaving dates, times, and/or locations. While another setting may be required that all metadata is erased.

In still further embodiments, the DI computer system 110 may detect one or more items of copyrighted information in the retrieved image. Then the DI computer system 110 may obscure the one or more items of copyrighted information in the retrieved image. The DI computer system 110 determine whether or not to obscure the one or more items of copyrighted information based upon the one or more security settings.

In some embodiments, the DI computer system 110 detects copyright information based upon comparisons with one or more databases of copyright information. These databases may be related to the DI computer system 110. These databases may also be separate from and in communication with the DI computer system 110. The DI computer system 110 may scan for copyright information in the images including, but not limited to, text data (such as passages and/or phrases from copyrighted material) and images (such as copyrighted photographs and company logos). The DI computer system 110 may determine which of these to potential copyrighted items to obscure based upon the corresponding security levels.

In additional embodiments, the one or more security settings include a plurality of levels of security. Each level of security of the plurality of levels of security indicates one or more items to be obscured. The settings may indicate which of the plurality of security levels are active. Then the levels indicate which items are to be obscured for that level of security. The levels of security may be set by a user and/or the system as needed.

While the above describes using the systems and processes described herein for analyzing two dimensional images, one having skill in the art would understand that these systems and methods may also be used for analyzing and processing videos and/or three-dimensional images and/or objects, such as those for use in virtual reality environments.

Exemplary Images of De-Identification Examples

FIG. 3 illustrates an exemplary image 300 with at least one face to be obscured, using the system 100 (shown in FIG. 1) and the process 200 (shown in FIG. 2). Image 300 is a sample image of a kitchen, specifically the reflection of a kitchen in the glass of the microwave door. In image 300 there is a reflection in the glass of the microwave door. In the reflection, there is the face 305 of an individual. In image 300, the face 305 of the individual in the reflection has been obscured, such as by using system 100 and process 200. The glass in the door of the microwave also includes printed information 310 about the microwave. The printed information 310 has also been obscured, such as by using system 100 and process 200. Further, there is a logo 315 on the microwave that has been obscured, such as by using system 100 and process 200.

Figure 4:
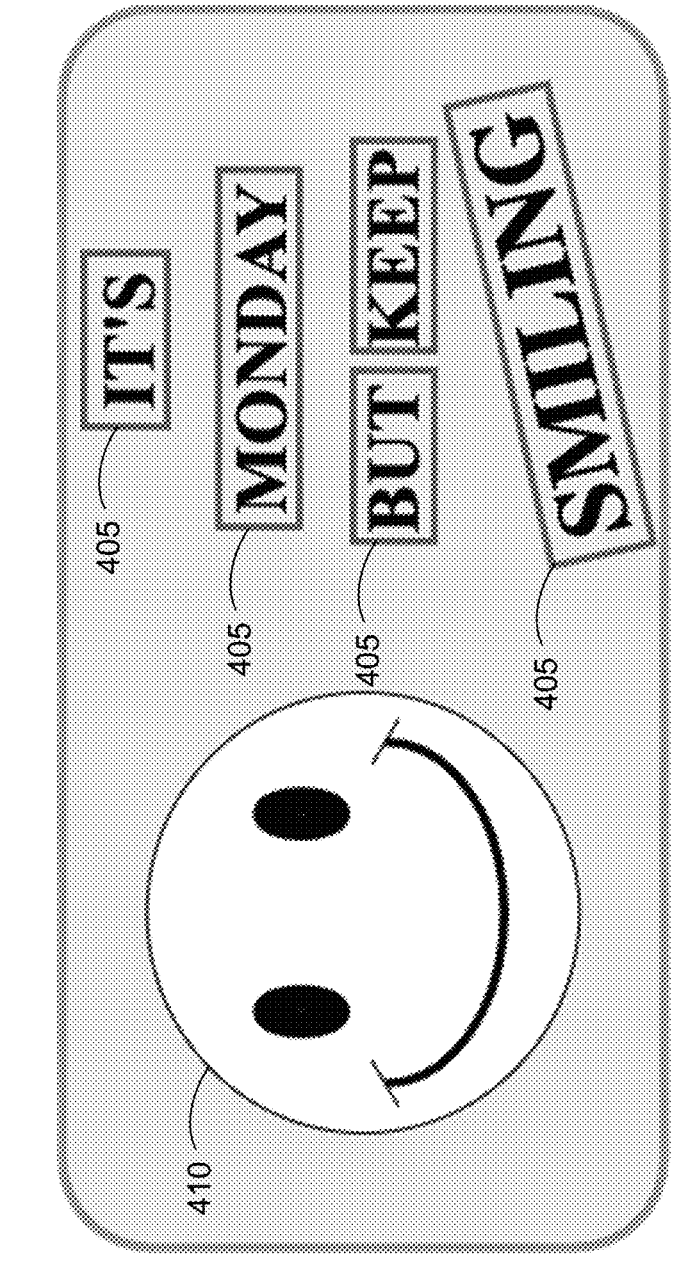
FIG. 4 illustrates an exemplary image with text that may need to be obscured, using the system shown in FIG. 1 and the process shown in FIG. 2.

FIG. 4 illustrates an exemplary image 400 with text that may need to be obscured, using the system 100 (shown in FIG. 1) and the process 200 (shown in FIG. 2). Image 400 includes a plurality of text 405 in different sizes and angles and an image of a face 410 on it. In the exemplary embodiment, the text recognition system 120 may recognize the text 405 and determine that the statement is "It's Monday but keep Smiling." The text recognition system 120 may then determine if the statement contains any PII. The text recognition system may also determine if the statement is copyrighted and/or trademarked, such as if the statement was a motto or popular statement associated with another business, etc. If the statement does not contain PII or copyrighted material, then the text recognition system 120 informs the DI computer system 110, that no text based PII was found in the image 400.

The image recognition system 115 analyzes the image 400 to detect any faces. The image recognition system 115 may detect the face 410. In some embodiments, the image recognition system 115 may determine that the face 410 is not that of a person, but instead a simple line drawing. In some further embodiments, the image recognition system 115 may also check the face 410 to determine if it is a copyrighted face, such as that of a famous fictional character. If the image 400 does not contain a real face or copyrighted material, then the image recognition system 115 informs the DI computer system 110, that no image based PII was found in the image 400. In that case, the DI computer system 110 returns the unprocessed image 105 (shown in FIG. 1).

Figure 5A:
FIGS. 5A and 5B illustrate before and after view of an image with exemplary personally identifiable information, in accordance with at least one embodiment.
Figure 5B:

FIGS. 5A and 5B illustrate before and after view of an image with personally identifiable information, in accordance with at least one embodiment. In FIG. 5A, the image 500 contains text 505, which indicates where the image 500 was taken. FIG. 5B shows image 510, which is image 500 after being processed by system 100 and process 200. The image recognition system 115 did not recognize any faces or other indicates of individuals in the image 500. Then the text recognition system 120 detected and analyzed the text 505. The text recognition system 120 determined that the text 505 contained PII and informed the DI computer system 110 (shown in FIG. 1). The DI computer system 110 had the image blurring system 125 blur out the text 505 so that a blurred area 515 replaced the text 505 as shown in the image 510.

Figure 6A:
FIGS. 6A and 6B illustrate two different images with faces and text to be obscured using the system shown in FIG. 1 and the process shown in FIG. 2.
Figure 6B:
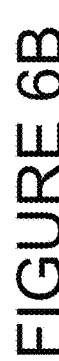

FIGS. 6A and 6B illustrate two different views of an image with faces and text to be obscured using the system 100 (shown in FIG. 1) and the process 200 (shown in FIG. 2). The image 600 in FIG. 6A is of a kitchen in a house. In the kitchen, a person 605 is blowing out the candles 610 on their cake. The system 100 blurs out the face of the person 605. The system 100 also blurs out the candles 610, which were shaped like numbers for the person's age. Image 620 in FIG. 6B is of another image of a kitchen in a house. In the kitchen, a person 625 is preparing food. The system 100 adds an obscurement over the face of the person 625. The system 100 also places an obscurement over one of the pictures 630 on the refrigerator. The system 100 further places an obscurement over text on a bottle 635 on the counter.

Figure 7A:
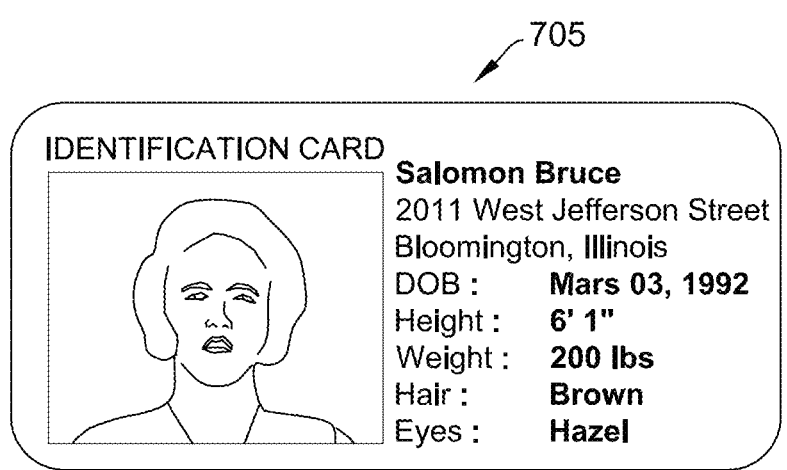
FIG. 7A illustrates an identification card with no obscurement.
Figure 7B:
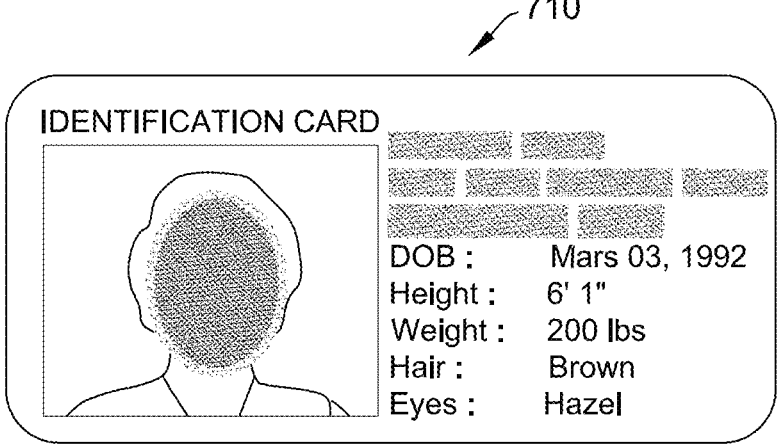
FIGS. 7B and 7C illustrate different levels of privacy-based obscurement using the computer system shown in FIG. 1 and the process shown in FIG. 2.
Figure 7C:
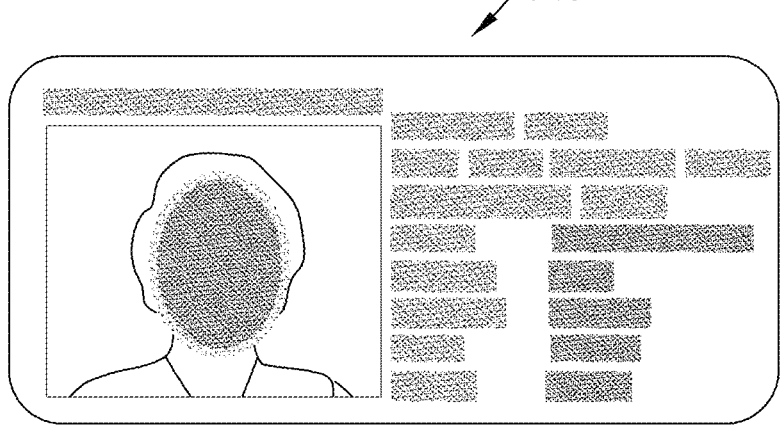

FIG. 7A illustrates an identification card with no obscurement. FIGS. 7B and 7C illustrate different levels of privacy-based obscurement using the computer system 100 (shown in FIG. 1) and the process 200 (shown in FIG. 2). In FIG.

7A, the image 700 is of an identification card and contains an identifying image of an individual and a plurality of text-based information about the individuals. FIG. 7B of image 705 shows the face being blurred and the personally identifying information being blurred. FIG. 7C of image 710 shows the face being blurred and all of the text being blurred as well. These two images 710 and 715 illustrate different levels of privacy-based obscurement that may be output by processing image 705 through system 100 and process 200.

Exemplary System

FIG. 8 illustrates an exemplary system 800 for performing the process 200 (shown in FIG. 2) using the de-identification system 100 (shown in FIG. 1). In the exemplary embodiment, the system 800 is used for analyzing image data to detect PII and obscure that PII in the image.

As described below in more detail, the DI computer system 110 may be programmed to analyze images to identify PII and then to obscure that PII. In addition, the DI computer system 110 may be programmed to train models to be used as the image recognition system 115 and/or the text recognition system 120 (both shown in FIG. 1). In some embodiments, the DI computer system 110 is programmed to execute the models as shown in FIG. 1. The DI computer system 110 may be programmed to (1) receive a plurality of images 105 (shown in FIG. 1); and/or (2) for each image 105 of the plurality of images 105, the at least one processor is programmed to: (a) retrieve 205 an image 105 of the plurality of images 105; (b) execute 210 at least one model to analyze the retrieved image 105 to detect one or more individuals; (c) identify 215 one or more items of text in the retrieved image 105; (d) analyze 220 the one or more items of text to detect one or more personally identifiable items; (e) identify 225 one or more items of text to obscure based upon one or more security settings; (f) update 230 the retrieved image to obscure at least one of the one or more items of text to obscure and the one or more individuals; and/or (g) provide 235 the updated image 130.

In the example embodiment, client devices 805 are computers that include a web browser or a software application, which enables client devices 805 to communicate with DI computer system 110 using the Internet, a local area network (LAN), or a wide area network (WAN). In some embodiments, the client devices 805 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 805 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

In the example embodiment, the DI computer system 110 (also known as DI server 110) is a computer that include a web browser or a software application, which enables DI computer system 110 to communicate with client devices 805 using the Internet, a local area network (LAN), or a wide area network (WAN). In some embodiments, the DI computer system 110 is communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. DI computer system 110 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

A database server 815 is communicatively coupled to a database 820 that stores data. In one embodiment, the database 820 is a database that includes one or more classification models, classification information, and/or security level settings. In some embodiments, the database 820 is stored remotely from the DI computer system 110. In some embodiments, the database 820 is decentralized. In the example embodiment, a person can access the database 820 via the client devices 805 by logging onto DI computer system 110. In some embodiments, the database 820 includes copyrighted material for the DI computer system 110 to scan for. The copyright information may include, but is not limited to, text data (such as passages and/or phrases from copyrighted material) and images (such as copyrighted photographs and company logos).

Third-party servers 825 may be any third-party server that DI computer system 110 is in communication with that provides additional functionality and/or information to DI computer system 110. For example, third-party server 825 may provide images. In the example embodiment, third-party servers 825 are computers that include a web browser or a software application, which enables third-party servers 825 to communicate with DI computer system 110 using the Internet, a local area network (LAN), or a wide area network (WAN). In some embodiments, the third-party servers 825 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Third-party servers 825 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

Exemplary Client Device

Figure 9:
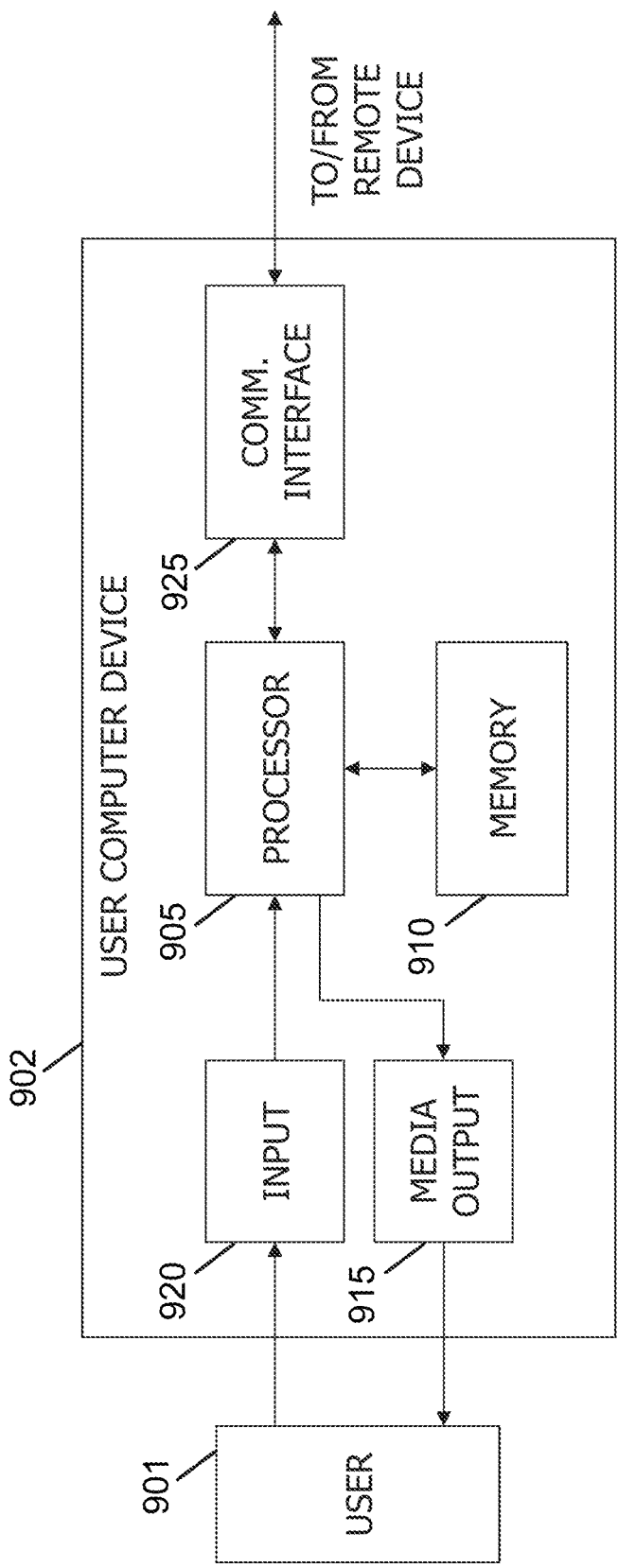
FIG. 9 illustrates an exemplary configuration of a user computer device, in accordance with one embodiment of the present disclosure.

FIG. 9 depicts an exemplary configuration 900 of user computer device 902, in accordance with one embodiment of the present disclosure. In the exemplary embodiment, user computer device 902 may be similar to, or the same as, client device 805 (shown in FIG. 8). User computer device 902 may be operated by a user 901.

User computer device 902 may include a processor 905 for executing instructions. In some embodiments, executable instructions may be stored in a memory area 910. Processor 905 may include one or more processing units (e.g., in a multi-core configuration). Memory area 910 may be any device allowing information such as executable instructions and/or transaction data to be stored and retrieved. Memory area 910 may include one or more computer readable media.

User computer device 902 may also include at least one media output component 915 for presenting information to user 901. Media output component 915 may be any component capable of conveying information to user 901. In some embodiments, media output component 915 may include an output adapter (not shown) such as a video adapter and/or an audio adapter. An output adapter may be operatively coupled to processor 905 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 915 may be configured to present a graphical user interface (e.g., a web browser and/or a client application) to user 901. A graphical user interface may include, for example, an interface for viewing items of information provided by the DI computer system 110 (shown in FIG. 1). In some embodiments, user computer device 902 may include an input device 920 for receiving input from user 901. User 901 may use input device 920 to, without limitation, provide information either through speech or typing.

Input device 920 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 915 and input device 920.

User computer device 902 may also include a communication interface 925, communicatively coupled to a remote device such as DI computer system 110. Communication interface 925 may include, for example, a wired or wireless network adapter and/or a wireless data transceiver for use with a mobile telecommunications network.

Stored in memory area 910 are, for example, computer readable instructions for providing a user interface to user 901 via media output component 915 and, optionally, receiving and processing input from input device 920. A user interface may include, among other possibilities, a web browser and/or a client application. Web browsers enable users, such as user 901, to display and interact with media and other information typically embedded on a web page or a website from DI computer system 110. A client application may allow user 901 to interact with, for example, DI computer system 110. For example, instructions may be stored by a cloud service, and the output of the execution of the instructions sent to the media output component 915.

Exemplary Server Device

Figure 10:
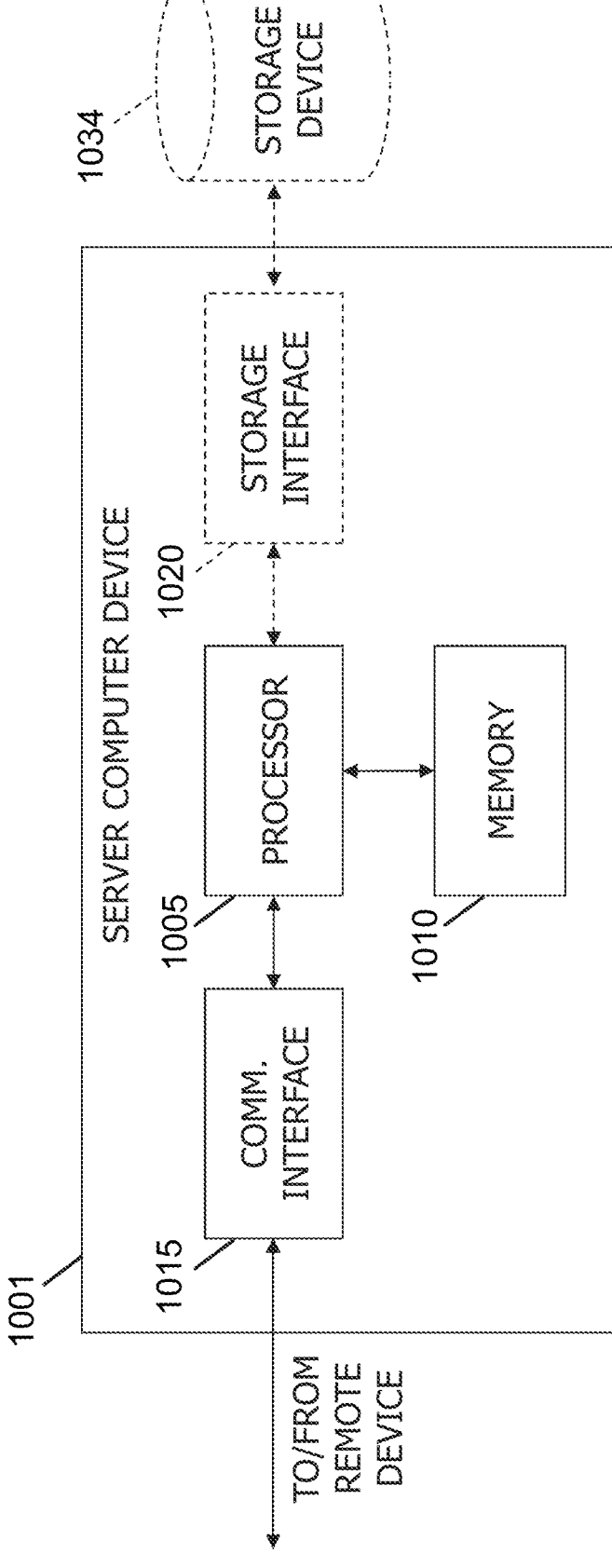
FIG. 10 illustrates an exemplary configuration of a server computer device, in accordance with one embodiment of the present disclosure.

FIG. 10 depicts an exemplary configuration 1000 of a server computer device 1001, in accordance with one embodiment of the present disclosure. In the exemplary embodiment, server computer device 1001 may be similar to, or the same as, DI computer system 110 (shown in FIG. 1), database server 815, and third-party server 825 (both shown in FIG. 8). Server computer device 1001 may also include a processor 1005 for executing instructions. Instructions may be stored in a memory area 1010. Processor 1005 may include one or more processing units (e.g., in a multi-core configuration).

Processor 1005 may be operatively coupled to a communication interface 1015 such that server computer device 1001 is capable of communicating with a remote device such as another server computer device 1001, DI computer system 110, third-party servers 825, and client devices 805 (shown in FIG. 8)(for example, using wireless communication or data transmission over one or more radio links or digital communication channels). For example, communication interface 1015 may audio input from client devices 805 via the Internet, as illustrated in FIG. 8.

Processor 1005 may also be operatively coupled to a storage device 1034. Storage device 1034 may be any computer-operated hardware suitable for storing and/or retrieving data, such as, but not limited to, data associated with one or more models. In some embodiments, storage device 1034 may be integrated in server computer device 1001. For example, server computer device 1001 may include one or more hard disk drives as storage device 1034.

In other embodiments, storage device 1034 may be external to server computer device 1001 and may be accessed by a plurality of server computer devices 1001. For example, storage device 1034 may include a storage area network (SAN), a network attached storage (NAS) system, and/or multiple storage units such as hard disks and/or solid-state disks in a redundant array of inexpensive disks (RAID) configuration.

In some embodiments, processor 1005 may be operatively coupled to storage device 1034 via a storage interface 1020. Storage interface 1020 may be any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

Processor 1005 may execute computer-executable instructions for implementing aspects of the disclosure. In some embodiments, the processor 1005 may be transformed into a special purpose microprocessor by executing computer-executable instructions or by otherwise being programmed. For example, the processor 1005 may be programmed with the instruction such as illustrated in FIG. 2.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, DI computer system 110 is configured to implement machine learning, such that DI computer system 110 "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of images with known characteristics or features. Such information may include, for example, information associated with a plurality of images of a plurality of different objects, items, and/or property.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, generative artificial intelligence (AI) models (also referred to as generative machine learning (ML) models) may be utilized with the present embodiments and may the voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

Based upon these analyses, the processing element may learn how to identify characteristics and patterns that may then be applied to analyzing and classifying objects. The processing element may also learn how to identify attributes of different objects in different lighting. This information may be used to determine which classification models to use and which classifications to provide.

Exemplary Embodiments

In one aspect, a computer system may be provided. The computer system may include one or more local or remote processors, servers, sensors, memory units, transceivers, mobile devices, wearables, smart watches, smart glasses or contacts, augmented reality glasses, virtual reality headsets, mixed or extended reality headsets, voice bots, chat bots, ChatGPT bots, and/or other electronic or electrical components, which may be in wired or wireless communication with one another. For instance, the computer system may include at least one processor in communication with at least one memory device. The at least one processor may be configured to: (1) receive a plurality of images; and/or (2) for each image of the plurality of images, the at least one processor is programmed to: (a) retrieve an image of the plurality of images; (b) execute at least one model to analyze the retrieved image to detect one or more individuals; (c) identify one or more items of text in the retrieved image; (d) analyze the one or more items of text to detect one or more personally identifiable items; (e) identify one or more items of text to obscure based upon one or more security settings; (f) update the retrieved image to obscure at least one of the one or more items of text to obscure and the one or more individuals; and/or (g) provide the updated image. The system may include additional, less, or alternate functionality, including that discussed elsewhere herein.

An enhancement of the system may include a processor configured to analyze the plurality of images based upon a plurality of user preference information. The images may be, for instance, retrieved from one or more memory units and/or acquired via one or more sensors, including cameras, mobile devices, AR or VR headsets or glasses, smart glasses, wearables, smart watches, or other electronic or electrical devices; and/or acquired via, or at the direction of, generative AI or machine learning models, such as at the direction of bots, such as ChatGPT bots, or other chat or voice bots, interconnected with one or more sensors, including cameras or video recorders.

A further enhancement of the system may include a processor configured to obscure the at least one of the one or more items of text to obscure and the one or more individuals. To obscure the one or more individuals, the system may also mask a plurality of pixels to cover each face of the one or more individuals. The system may further alter pixels within a predetermined distance of the at least one of the one or more personally identifiable items.

A further enhancement of the system may include the at least one model is trained to recognize a face of an individual in a reflection.

A further enhancement of the system may include a processor configured to remove one or more pieces of metadata associated with the retrieved image. Additionally or alternatively, a further enhancement of the system may include a processor configured to determine the one or more pieces of metadata to remove based upon the one or more security settings.

A further enhancement of the system may include a processor configured to detect one or more items of copyrighted information in the retrieved image. The system may also obscure the one or more items of copyrighted information in the retrieved image. The system may further determine whether or not to obscure the one or more items of copyrighted information based upon the one or more security settings.

A further enhancement of the system may include where the one or more security settings include a plurality of levels of security. The system may also include where each level of security of the plurality of levels of security indicates one or more items to be obscured.

In another aspect, a computer-implemented method may be provided. The computer-implemented method may be performed by a de-identification computer device including at least one processor in communication with at least one memory device. The method may include: (1) receiving a plurality of images; and/or for each image of the plurality of images, the method further comprises: (a) retrieving an image of the plurality of images; (b) executing at least one model to analyze the retrieved image to detect one or more individuals; (c) identifying one or more items of text in the retrieved image; (d) analyzing the one or more items of text to detect one or more personally identifiable items; (e) identifying one or more items of text to obscure based upon one or more security settings; (f) updating the retrieved image to obscure at least one of the one or more items of text to obscure and the one or more individuals; and/or (g) providing the updated image. The computer-implemented method may include additional, less, or alternate actions, including those discussed elsewhere herein.

An enhancement of the computer-implemented method may include analyzing the plurality of images based upon a plurality of user preference information. The images may be, for instance, retrieved from one or more memory units and/or acquired via one or more sensors, including cameras, mobile devices, AR or VR headsets or glasses, smart glasses, wearables, smart watches, or other electronic or electrical devices; and/or acquired via, or at the direction of, generative AI or machine learning models, such as at the direction of bots, such as ChatGPT bots, or other chat or voice bots, interconnected with one or more sensors, including cameras or video recorders An enhancement of the computer-implemented method may include obscuring the at least one of the one or more items of text to obscure and the one or more individuals. Additionally or alternatively, a further enhancement of the computer-implemented method may include where to obscure the one or more individuals, the method may also include masking a plurality of pixels to cover each face of the one or more individuals.

A further enhancement of the computer-implemented method may include altering pixels within a predetermined distance of the at least one of the one or more personally identifiable items. Additionally or alternatively, a further enhancement of the computer-implemented method may include where the at least one model is trained to recognize a face of an individual in a reflection.

A further enhancement of the computer-implemented method may include removing one or more pieces of metadata associated with the retrieved image. The method may also include determining the one or more pieces of metadata to remove based upon the one or more security settings.

A further enhancement of the computer-implemented method may include detecting one or more items of copyrighted information in the retrieved image. The method may also include obscuring the one or more items of copyrighted information in the retrieved image. The method may also include determining whether or not to obscure the one or more items of copyrighted information based upon the one or more security settings.

A further enhancement of the computer-implemented method may include where the one or more security settings include a plurality of levels of security. The method may also include where each level of security of the plurality of levels of security indicates one or more items to be obscured.

In another aspect, at least one non-transitory computer-readable media having computer-executable instructions embodied thereon may be provided. When executed by a computing device including at least one processor in communication with at least one memory device, the computer-executable instructions may cause the at least one processor to: (1) receive a plurality of images; and/or (2) for each image of the plurality of images, the at least one processor is programmed to: (a) retrieve an image of the plurality of images; (b) execute at least one model to analyze the retrieved image to detect one or more individuals; (c) identify one or more items of text in the retrieved image; (d) analyze the one or more items of text to detect one or more personally identifiable items; (e) identify one or more items of text to obscure based upon one or more security settings; (f) update the retrieved image to obscure at least one of the one or more items of text to obscure and the one or more individuals; and/or (g) provide the updated image. The computer-executable instructions may direct additional, less, or alternate functionality, including that discussed elsewhere herein.

An enhancement may include a processor configured to analyze the plurality of images based upon a plurality of user preference information. The images may be, for instance, retrieved from one or more memory units and/or acquired via one or more sensors, including cameras, mobile devices, AR or VR headsets or glasses, smart glasses, wearables, smart watches, or other electronic or electrical devices; and/or acquired via, or at the direction of, generative AI or machine learning models, such as at the direction of bots, such as ChatGPT bots, or other chat or voice bots, interconnected with one or more sensors, including cameras or video recorders.

A further enhancement may include a processor configured to obscure the at least one of the one or more items of text to obscure and the one or more individuals. To obscure the one or more individuals, the processor may also mask a plurality of pixels to cover each face of the one or more individuals. The processor may further alter pixels within a predetermined distance of the at least one of the one or more personally identifiable items.

A further enhancement may include the at least one model is trained to recognize a face of an individual in a reflection.

A further enhancement may include a processor configured to remove one or more pieces of metadata associated with the retrieved image. Additionally or alternatively, a further enhancement may include a processor configured to determine the one or more pieces of metadata to remove based upon the one or more security settings.

A further enhancement may include a processor configured to detect one or more items of copyrighted information in the retrieved image. The processor may also obscure the one or more items of copyrighted information in the retrieved image. The processor may further determine whether or not to obscure the one or more items of copyrighted information based upon the one or more security settings.

A further enhancement may include where the one or more security settings include a plurality of levels of security. The processor may also include where each level of security of the plurality of levels of security indicates one or more items to be obscured.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, NoSQL, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An image de-identification computer system for identifying and removing personally identifiable information from images, the computer system comprising at least one processor in communication with at least one memory device, wherein the at least one processor programmed to:
   receive a plurality of images; and
   for each image of the plurality of images, the at least one processor is programmed to:
      retrieve the image;
      execute at least one model to analyze the retrieved image to detect one or more representations of individuals in the image;
      identify one or more items of text in the retrieved image;
      analyze the one or more items of text to detect one or more personally identifiable items of text from the one or more items of text;
      identify one or more personally identifiable items of text to obscure based upon one or more security settings;
      update the retrieved image to obscure at least one of the one or more items of personally identifiable text and the one or more representations of individuals in the image, wherein obscuring includes altering pixels within a predetermined number of pixels of the pixels identified as forming the at least one of the one or more items of personally identifiable text and the one or more representations of individuals in the image; and
      provide the updated image.

2. The computer system of claim 1, where in the at least one processor is further programmed to obscure the at least one of the one or more items of personally identifiable text and the one or more representations of individuals in the image.

3. The computer system of claim 1, wherein to obscure the one or more representations of individuals in the image, the at least one processor is further programmed to mask a plurality of pixels to cover each face of the one or more representations of individuals in the image.

4. The computer system of claim 1, wherein the at least one model is trained to recognize a face of an individual in a reflection.

5. The computer system of claim 1, wherein the at least one processor is further programmed to remove one or more pieces of metadata associated with the retrieved image.

6. The computer system of claim 5, wherein the at least one processor is further programmed to determine the one or more pieces of metadata to remove based upon the one or more security settings.

7. The computer system of claim 1, wherein the at least one processor is further programmed to:
   detect one or more items of copyrighted information in the retrieved image; and
   obscure the one or more items of copyrighted information in the retrieved image.

8. The computer system of claim 7, wherein the at least one processor is further programmed to determine whether or not to obscure the one or more items of copyrighted information based upon the one or more security settings.

9. The computer system of claim 1, wherein the one or more security settings include a plurality of levels of security, and wherein each level of security of the plurality of levels of security indicates different items to be obscured.

10. A computer-implemented method for identifying and removing personally identifiable information from images, the method performed by a de -identification computer device including at least one processor in communication with at least one memory device, the method comprising:
   receiving a plurality of images; and
   for each image of the plurality of images, the method further comprises:
      retrieving the image;
      executing at least one model to analyze the retrieved image to detect one or more representations of individuals in the image;
      identifying one or more items of text in the retrieved image;
      analyzing the one or more items of text to detect one or more personally identifiable items of text from the one or more items of text;
      identifying one or more personally identifiable items of text to obscure based upon one or more security settings;
      updating the retrieved image to obscure at least one of the one or more items of personally identifiable text and the one or more representations of individuals in the image, wherein obscuring comprises altering pixels within a predetermined number of pixels of the pixels identified as forming the at least one of the one or more items of personally identifiable text and the one or more representations of individuals in the image; and
      providing the updated image.

11. The computer-implemented method of claim 10, wherein the one or more security settings include a plurality of levels of security, and wherein each level of security of the plurality of levels of security indicates different items to be obscured.

12. The computer-implemented method of claim 10, wherein to obscure the one or more representations of individuals in the image, the method further comprises masking a plurality of pixels to cover each face of the one or more representations of individuals in the image.

13. The computer-implemented method of claim 10 further comprising removing one or more pieces of metadata associated with the retrieved image.

14. The computer-implemented method of claim 10 further comprising:
   detecting one or more items of copyrighted information in the retrieved image; and
   obscuring the one or more items of copyrighted information in the retrieved image.

15. The computer-implemented method of claim 10, wherein the at least one model is trained to recognize a face of an individual in a reflection.

16. At least one non-transitory computer-readable media having computer-executable instructions embodied thereon for identifying and removing personally identifiable information from images, wherein when executed by an image computing device including at least one processor in communication with at least one memory device, the computer-executable instructions cause the at least one processor to:

receive a plurality of images; and for each image of the plurality of images, the computer-executable instructions also cause the at least one processor to:

retrieve the image;

execute at least one model to analyze the retrieved image to detect one or more representations of individuals in the image;

identify one or more items of text in the retrieved image;

analyze the one or more items of text to detect one or more personally identifiable items of text from the one or more items of text;

identify one or more personally identifiable items of text to obscure based upon one or more security settings;

update the retrieved image to obscure at least one of the one or more items of personally identifiable text and the one or more representations of individuals in the image, wherein obscuring includes altering pixels within a predetermined number of pixels of the pixels identified as forming the at least one of the one or more items of personally identifiable text and the one or more representations of individuals in the image; and provide the updated image.

17. The media of claim 16, wherein the one or more security settings include a plurality of levels of security, and wherein each level of security of the plurality of levels of security indicates different items to be obscured.

18. The media of claim 16, the computer-executable instructions also cause the at least one processor to remove one or more pieces of metadata associated with the retrieved image.

19. The media of claim 16, the computer-executable instructions also cause the at least one processor to:

detect one or more items of copyrighted information in the retrieved image; and obscure the one or more items of copyrighted information in the retrieved image.

* * * * *